Sept. 29, 1931.    K. F. BERTHOLD    1,825,140
BOX FASTENER MACHINE
Filed May 2, 1928    9 Sheets-Sheet 1

Sept. 29, 1931.   K. F. BERTHOLD   1,825,140
BOX FASTENER MACHINE
Filed May 2, 1928   9 Sheets-Sheet 2

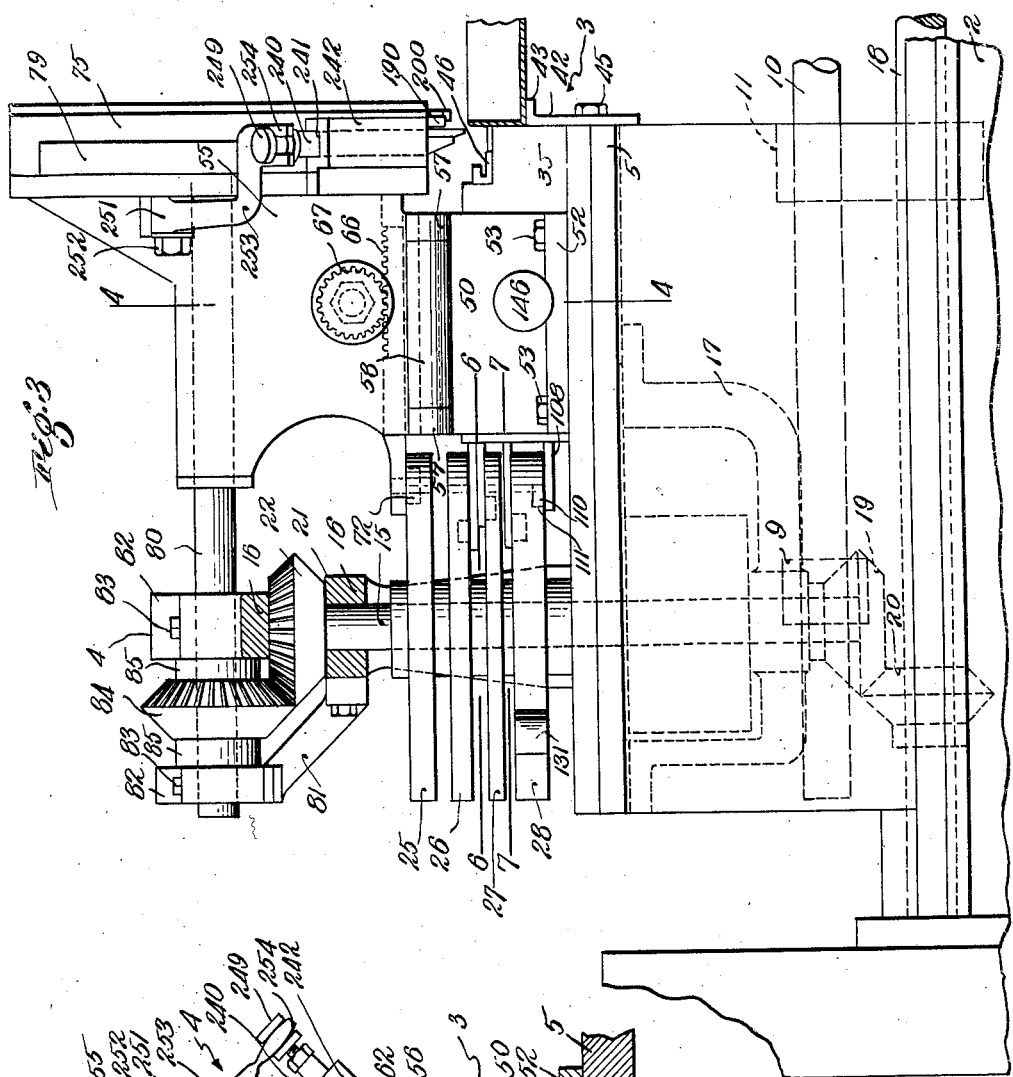

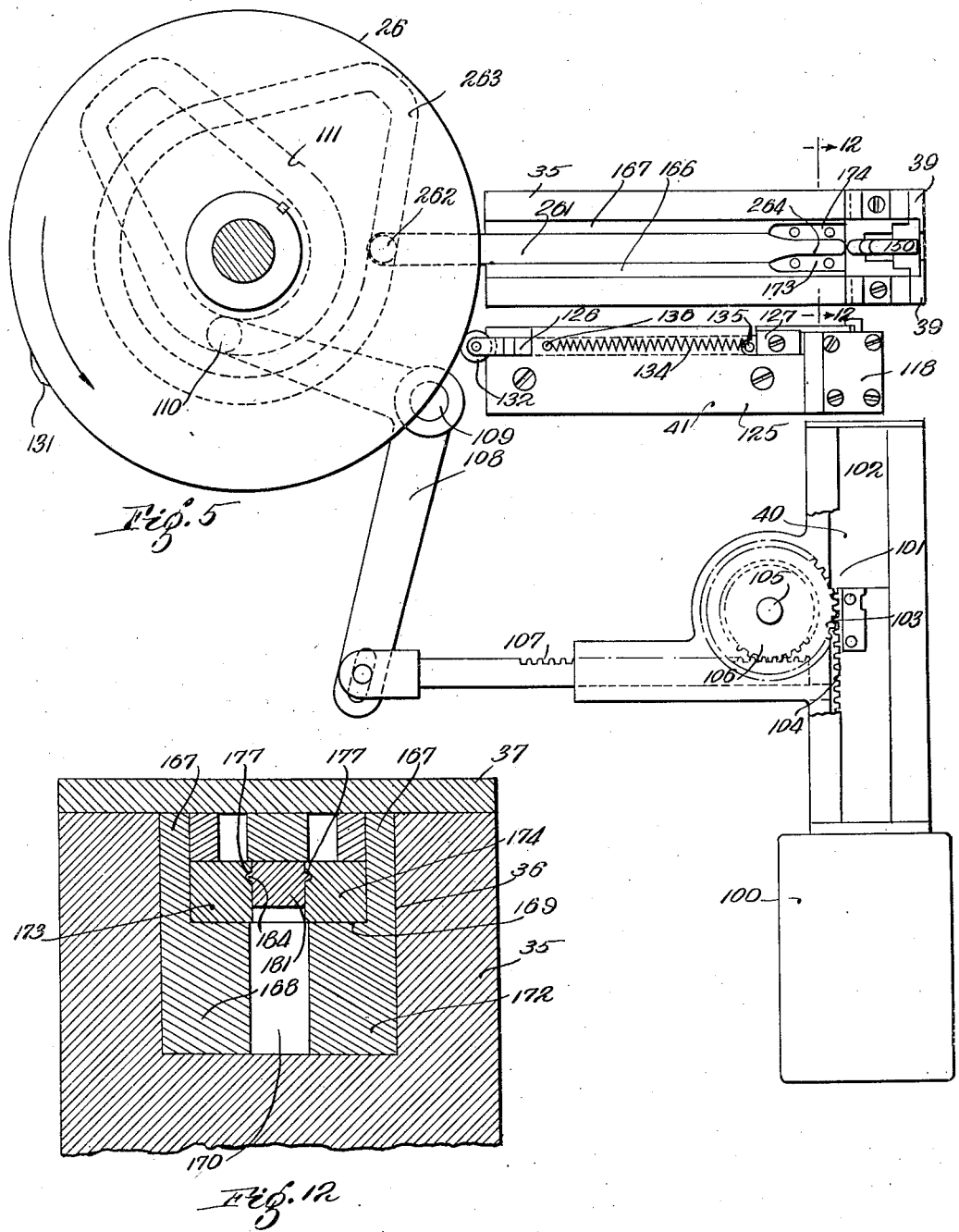

Sept. 29, 1931.   K. F. BERTHOLD   1,825,140
BOX FASTENER MACHINE
Filed May 2, 1928   9 Sheets-Sheet 5
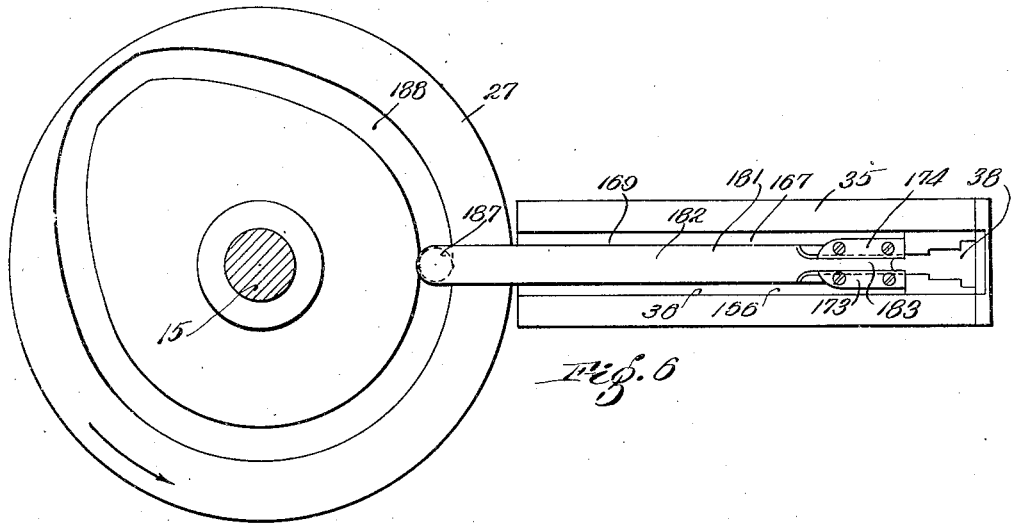
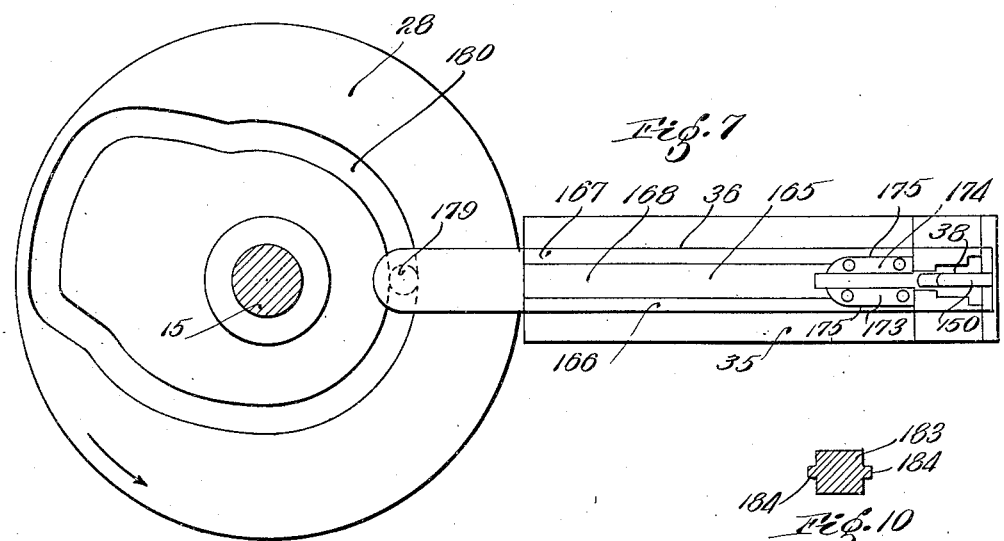
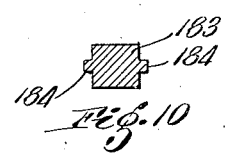
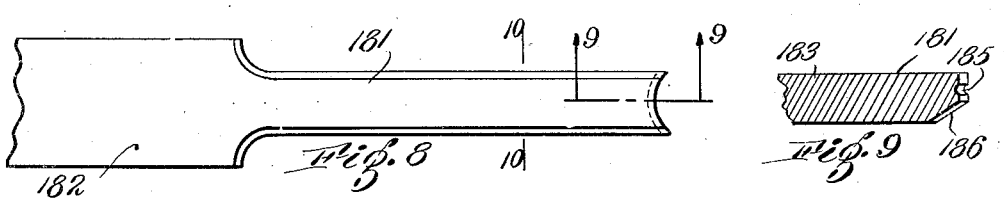
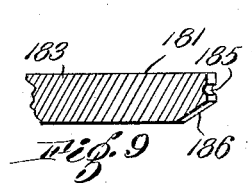
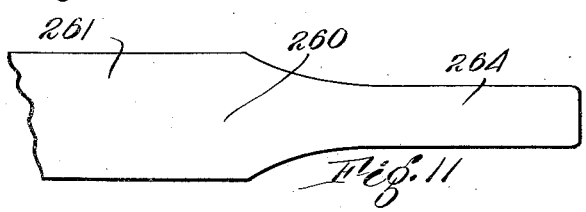

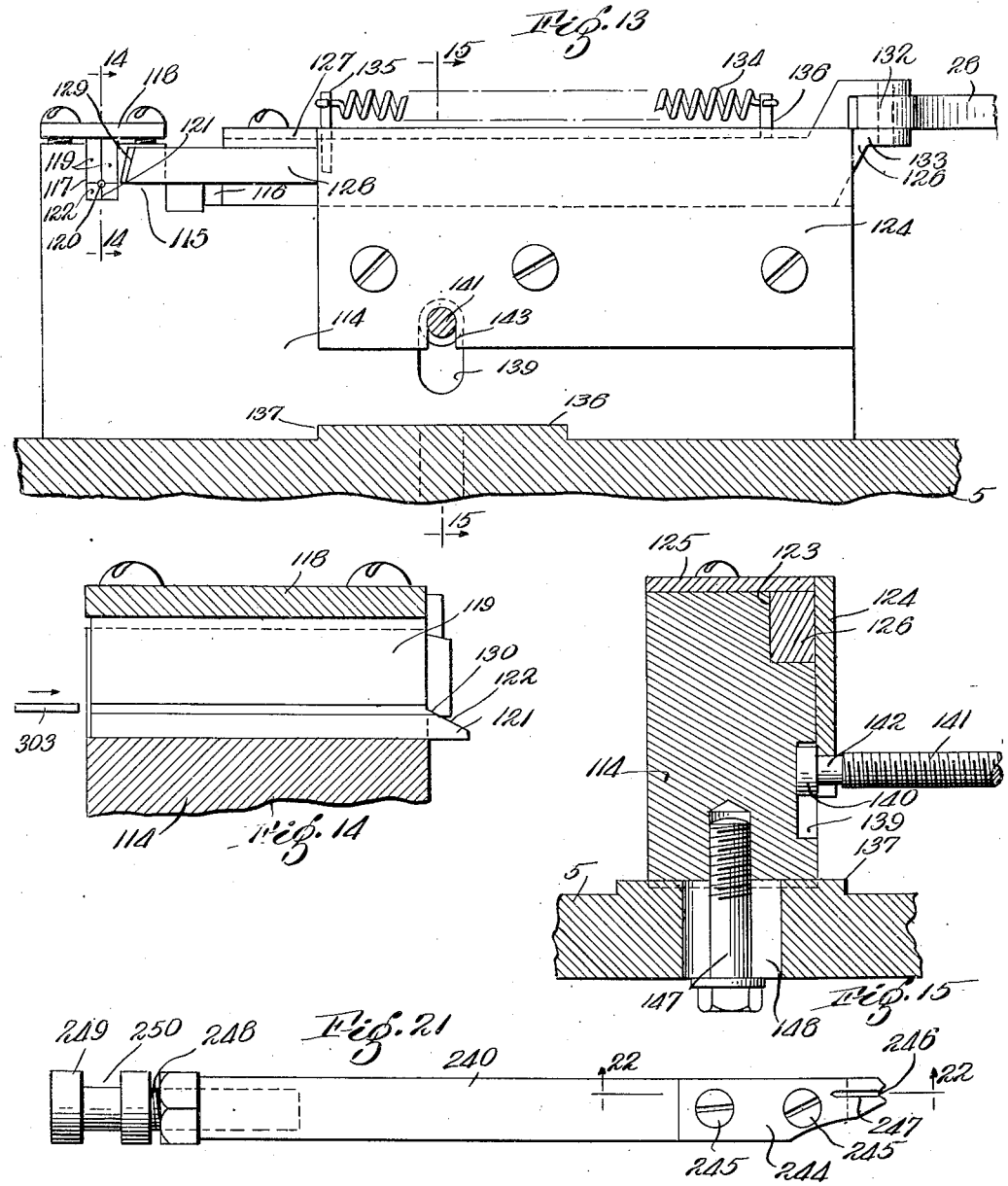

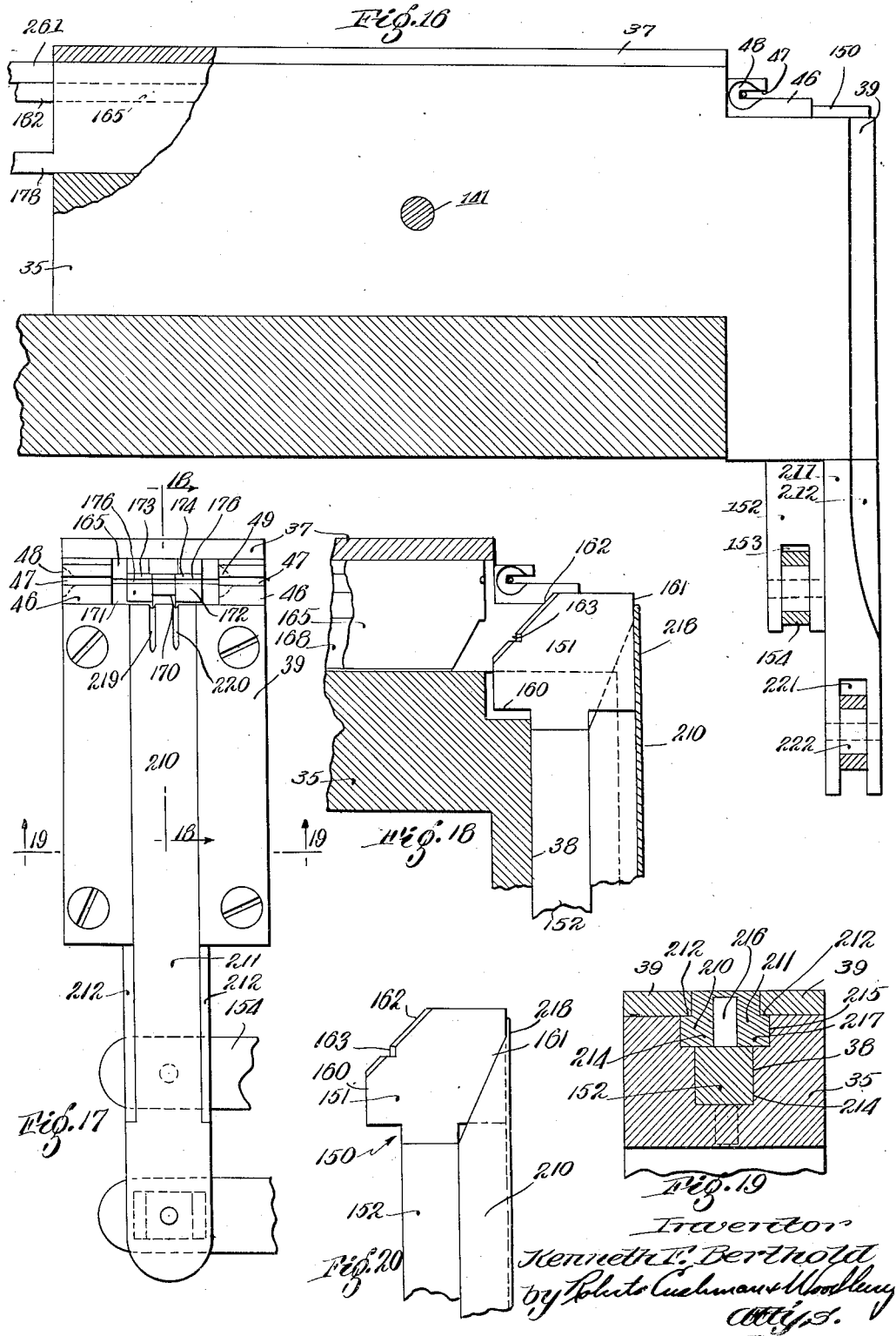

Sept. 29, 1931.   K. F. BERTHOLD   1,825,140
BOX FASTENER MACHINE
Filed May 2, 1928   9 Sheets-Sheet 8
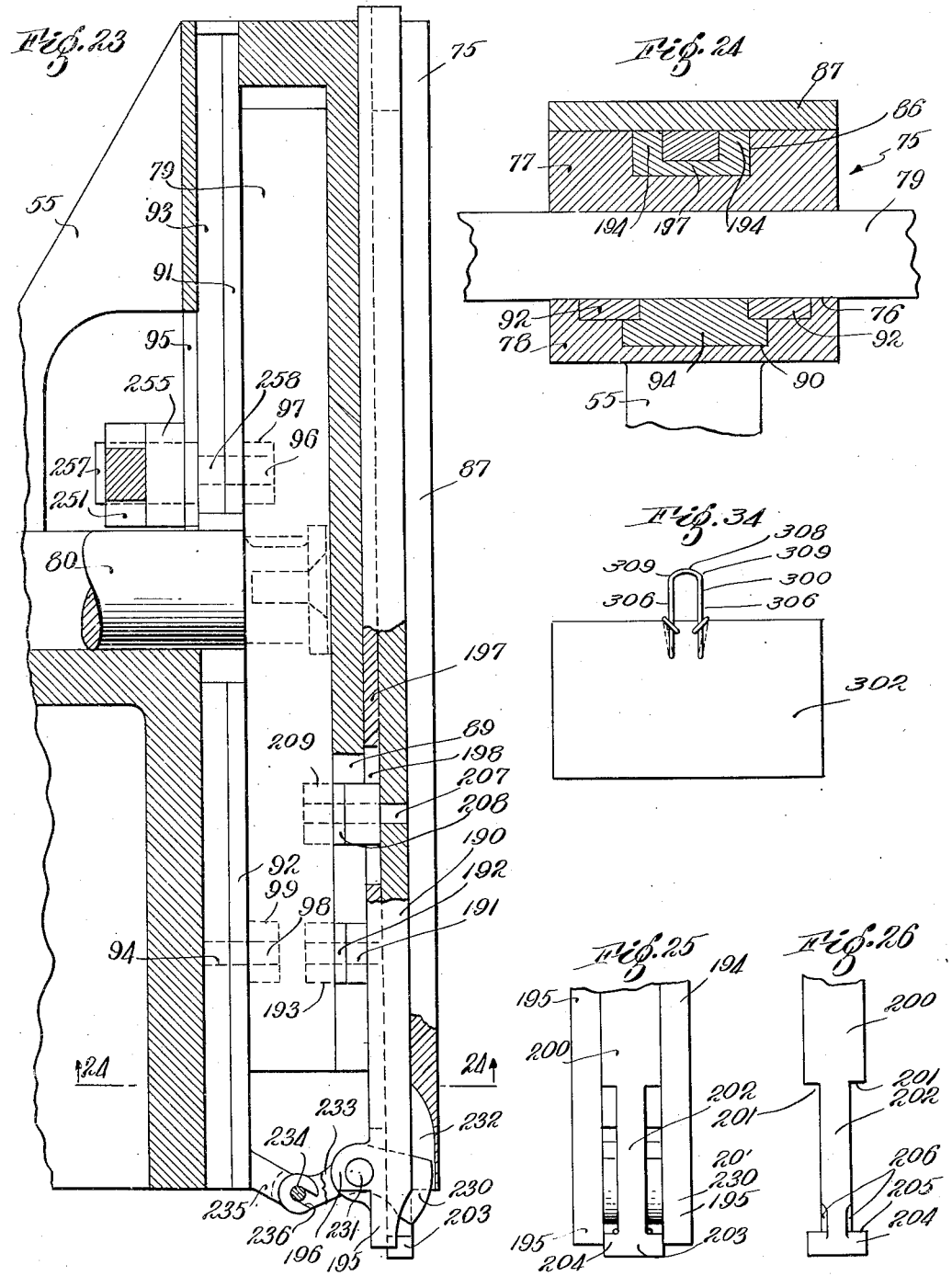

Sept. 29, 1931.   K. F. BERTHOLD   1,825,140
BOX FASTENER MACHINE
Filed May 2, 1928   9 Sheets-Sheet 9
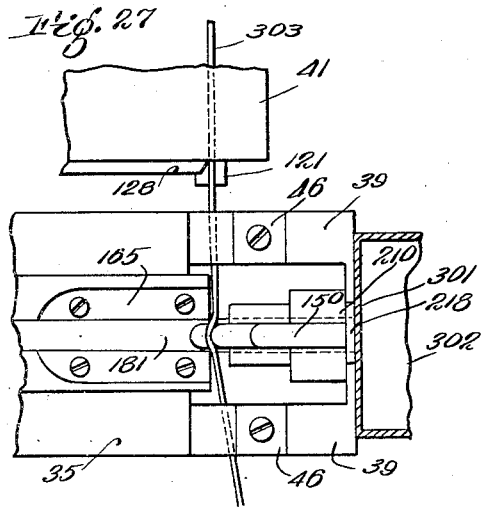
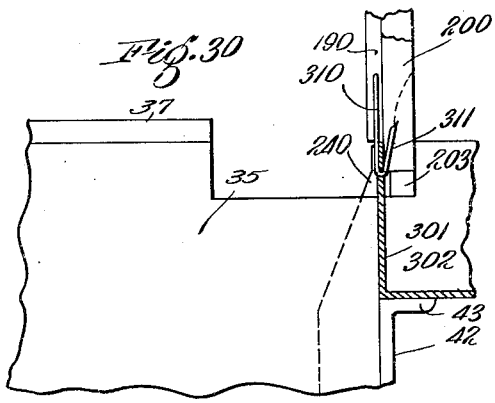
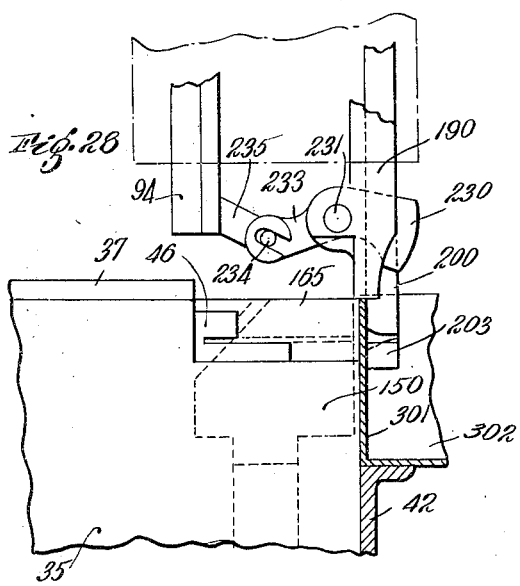
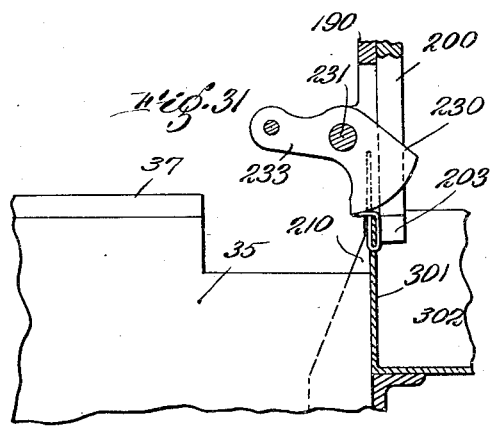
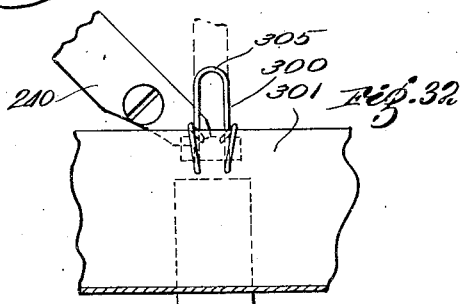
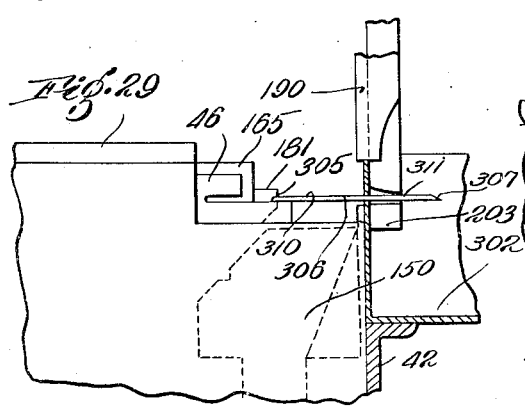
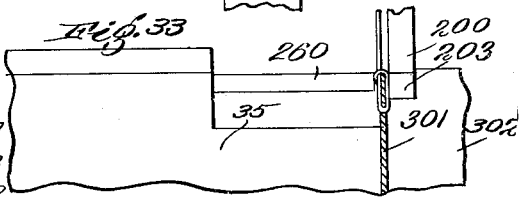

Patented Sept. 29, 1931

1,825,140

UNITED STATES PATENT OFFICE

KENNETH F. BERTHOLD, OF NORTH ATTLEBORO, MASSACHUSETTS, ASSIGNOR TO THE MASON BOX COMPANY, OF ATTLEBORO FALLS, MASSACHUSETTS, A CORPORATION OF MASSACHUSETTS

BOX FASTENER MACHINE

Application filed May 2, 1928. Serial No. 274,438.

This invention relates to a machine adapted to form, insert partially through the wall of a box and secure therein a fastener of the type disclosed in my copending application Serial No. 82,280, filed January 19, 1926.

The primary object of this invention is to provide means for forming from a length of ductile wire a fastener, inserting said fastener through the wall of a box and so manipulating said fastener that it is secured firmly in place.

Another object of this invention is to provide means for securing a fastener of the type mentioned above to the wall of a box without marring or weakening the wall of the box.

A further object of this invention is to provide coacting mechanism for forming and inserting such a fastener through the wall of said box.

Other objects of this invention reside in the structure and coaction of the elements of a machine made in accordance with the invention, one embodiment of which is set forth in the following description and in the drawings which form a part thereof and in which Fig. 1 is a front elevation of a machine embodying this invention and provided with a pair of units similarly constructed and adapted to operate simultaneously upon opposite sides of a box;

Fig. 3 is a rear elevation of the right-hand unit shown in Fig. 1;

Fig. 4 is a section taken along the line 4—4 of Fig. 3;

Fig. 5 is a sectional plan view illustrating the relation of the feeding, cutting and forming elements of the machine showing the position they will assume in the unit at the left of Fig. 1;

Figure 1:
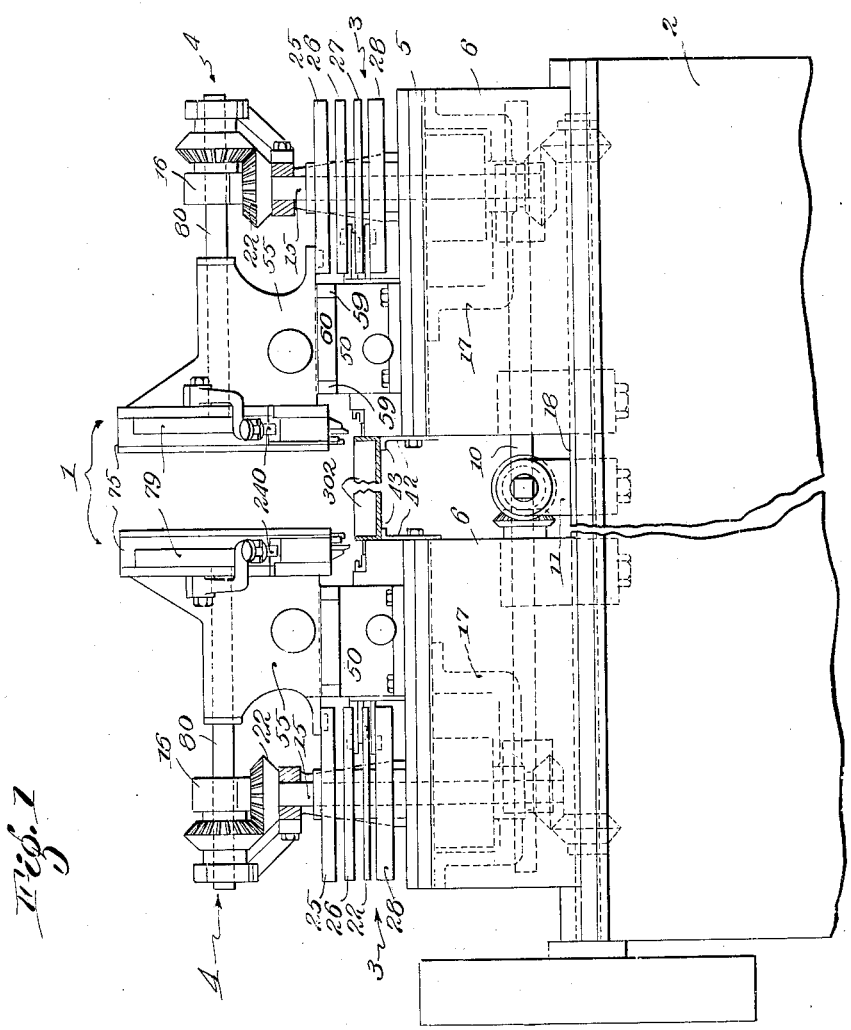

Figs. 6 and 7 are sectional plan views taken along the lines 6—6 and 7—7 of Fig. 3, and illustrating the inserter mechanism and the forming mechanism, respectively;

Fig. 8 is a plan view on a large scale of the inserter;

Figs. 9 and 10 are sectional views taken along the lines 9—9 and 10—10 of Fig. 8;

Fig. 11 is an enlarged plan view of the forward end of the clencher;

Fig. 12 is an enlarged sectional view taken along the line 12—12 of Fig. 5, illustrating the interrelation of the former, inserter and clencher;

Fig. 13 is an enlarged elevation of the cutting mechanism;

Figs. 14 and 15 are sectional views taken on an enlarged scale along the lines 14—14 and 15—15, respectively, of Fig. 13;

Fig. 16 is an enlarged elevation with parts broken away of that portion of a unit which embodies the fastener forming and associated mechanism and certain of the fastener manipulating mechanisms;

Fig. 17 is an elevation taken from the right of Fig. 16;

Figs. 18 and 19 are sectional views taken along the lines 18—18 and 19—19, respectively, of Fig. 17;

Fig. 20 is an enlarged elevation of a portion of the anvil on which the fastener is formed and of one of the fastener manipulating elements;

Fig. 21 is an enlarged elevation of one of the end turners;

Fig. 22 is a sectional view taken along the line 22—22 of Fig. 21;

Fig. 23 is an enlarged sectional view of the upright in which certain of the fastener manipulating mechanisms are supported;

Fig. 24 is a sectional view taken along the line 24—24 of Fig. 23;

Fig. 25 is an elevation of a portion of certain of the manipulating mechanisms disclosed in Fig. 23;

Fig. 26 is an elevational view of the lower portion of the end folder;

Fig. 27 is a plan view illustrating the preliminary bending of the wire from which the fastener is made prior to the cutting operation;

Fig. 28 is a side elevation illustrating the position taken by various elements at the time the fastener is completely formed and before it is inserted through the wall of the box;

Fig. 29 is a view similar to Fig. 28 of the position of the elements after the fastener has been inserted through the wall of the box;

Fig. 30 illustrates the position of the elements when the loop has been entirely folded and the ends have been partially folded;

Fig. 31 illustrates the position of the elements when the end benders have completed their operation;

Fig. 32 is a view from the inside of the box illustrating the position of the elements after the end turner has functioned;

Fig. 33 is a view similar to Fig. 28 illustrating the completion of the final manipulating operation; and Fig. 34 is a view from the outside of the box illustrating the fastener in its final position.

Before discussing the details of construction and operation of the various mechanisms of this machine, its operation will be described briefly at this time with reference particularly to Figs. 3 and 27 to 34, inclusive. In Fig. 3 one unit of the machine is shown at rest, before the operation of forming the fastener and securing it in the wall of the box, see Fig. 34, is started. The drive shaft 15 is rotated in the counterclockwise direction, the anvil 150 rises and at the same time the wire is fed between the anvil 150 and the former 165. When the anvil 150 reaches the upper position (see in dotted lines, Fig. 28), the former 165 advances a short distance to clamp the wire against the anvil and give it a slight preliminary bend, see Fig. 27. The wire is severed while thus clamped against movement and the formed 165 advances to bend it at each side of the anvil 165 into the form of a staple as shown in dotted lines in Fig. 27 and Fig. 28.

The cutter retreats and at the same time the presser-foot 190 descends to engage the upper edge of the wall and fix the box in position on the supporting ledge 42. Concomitantly with this movement of the presser-foot 190 the end folder 200 carried by the machine head descends inside the box and when the folder reaches its lowest position the head retreats bodily so that the wall is held firmly between the end folder 200 and the former 165. The anvil 150 descends out of the loop of the staple and at the same time the inserter 181 advances to force the pointed ends of the staple through the wall of the box and over the shoulders of the end folder 200. This operation is shown in Fig. 29. The former 165 withdraws so that the staple is supported by the wall of the box and the inserter.

The loop folder 210 rises and at the same time the inserter 181 is retracted so that the loop is raised into the position shown in Fig. 30. As the loop folder 210 starts the upward folding of the loop, the head of the machine is advanced to carry the end folder 200 a slight distance away from the wall of the box which distance is substantially the thickness of the wire used in the formation of the staple. The end folder begins its operation after the loop folder has given the initial bend to the loop. These folders 210 and 200 bring the loop of the fastener against the outer face of the wall and the ends of the fastener against the inner face of the wall. The end benders 230 are swung on their pivots while the loop folder 210 and end folder 200 are at their highest positions to bend the ends of the wire across the upper edge of the box and of the loop folder 210 at each side of the loop (Fig. 31). As the end benders 230 complete this operation the end turners 240 descend and the loop folder 210 is lowered so that the ends are pressed across the legs of the loop as shown in Fig. 32. The end clencher 260 advances as soon as the end turners 240 are withdrawn and forces the tips of the fastener into the loop and embeds them in the wall of the box which is held against yielding by the end folder. This final operation is shown in Fig. 33. The presser-foot 190 and end folder 200 then rise and the clencher 260 retreats so that the completed box can be removed from the supporting ledges 42.

The fastener 300 which is secured to the walls 301 of the box 302 is cut from a length of ductile wire 303 and bent by the former 165 around the anvil into a staple-like form having a head 305 and shanks 306, which terminate in pointed tips 307. The central portion 308 of the head is substantially at right angles to the shanks 306 and connected thereto by shoulders 309. For purpose of convenience the loop end of the fastener will be designated as 310 and the other end will be designated as 311.

In the drawings the machine embodying one form of this invention and designated by the numeral 1 is made up of two units mounted upon a bench or table 2. These units operate simultaneously upon the opposite walls of a box and are adjustable toward and from each other to accord with the distance between the walls to be operated upon. Since the units are identical in construction only one will be described in detail, it being understood that the same reference numerals will be applied to the corresponding parts of each unit.

Figure 2:
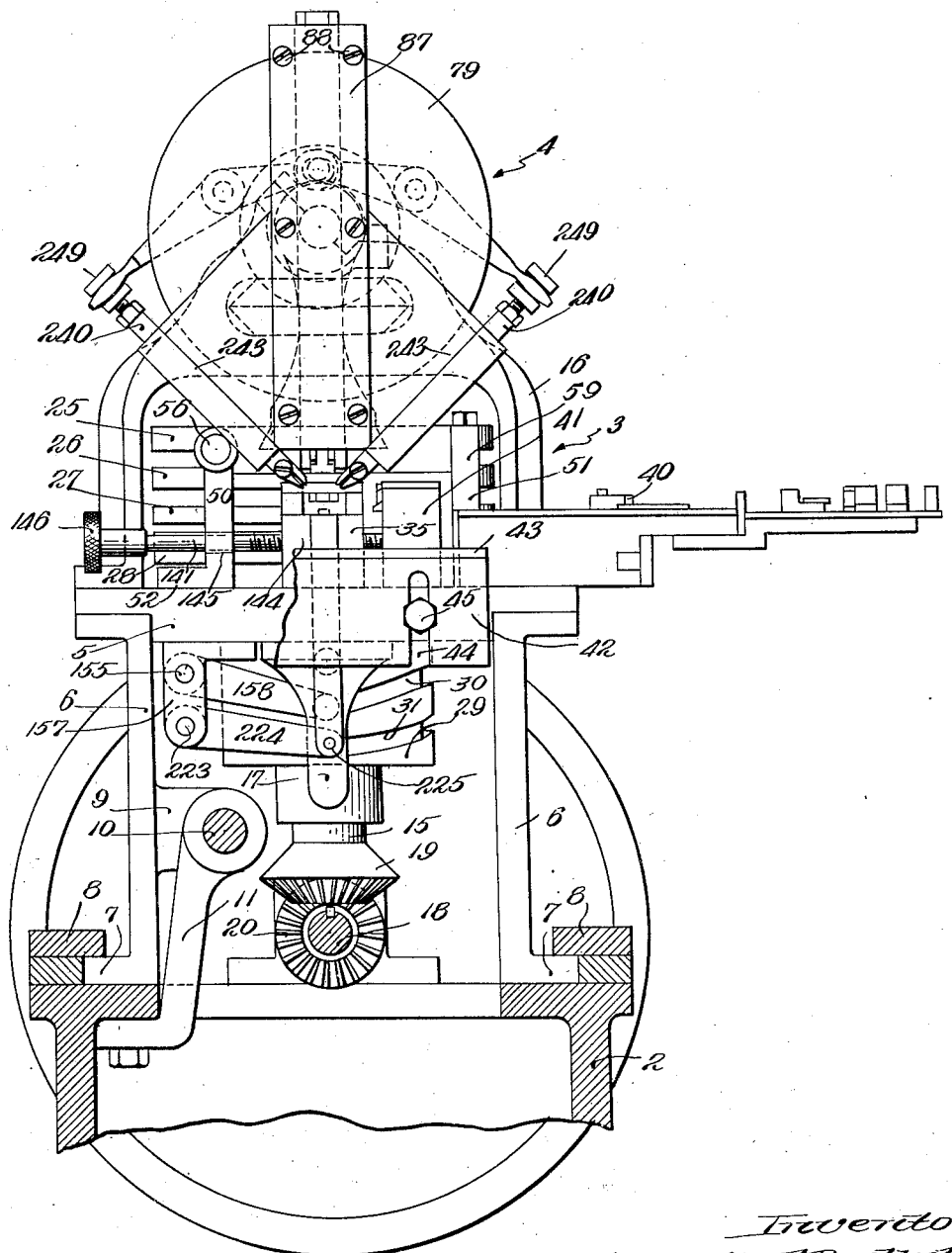
Fig. 2 is a side elevation.

Each unit (see Figs. 2, 3 and 4) comprises a base 3 and a head 4. The base 3 includes a supporting platform 5 mounted upon a pair of horizontally extending U-beams 6. The lower flange 7 of each beam enters guides 8 of the table 2 in which the units may be reciprocated. One form of means for reciprocating these units is shown in the drawings as comprising a boss 9 rigidly secured to the inner face of one of the beams 6, a shaft 10 which rotates freely in the boss 9 and is prevented from disengagement therewith by collars or other suitable means and a bracket 11 carried by the table 2 and in threaded engagement with said shaft.

Mounted in the base 3 is a vertical shaft 15 guided in brackets 16 and 17 provided with suitable bearings to permit the free rotation of the shaft 15 in the brackets. The bracket 16 is secured to the upper face of the platform 5, and the bracket 17 is secured to the lower face of the platform. The vertical shaft 15 is actuated by a drive shaft 18, which is rotated by any suitable source of power through intermeshing beveled gears 19 and 20 on the shafts 15 and 18. In the brackets 16 is provided an opening 21 which receives a beveled gear 22 carried at the upper end of the shaft 15. On the shaft 15 between the platform 5 and the bracket 16 are fixed a plurality of cams 25, 26, 27 and 28. These cams preferably are provided with collars to ensure the proper spaced relation between them. Between the platform 5 and the bracket 17 is a cam 29 suitably fixed to the shaft 15 and provided on its outer surface with paths 30 and 31.

Mounted on the platform 5 in front of the shaft 15 and its cams is a block 35 in which certain of the operating devices are supported. This block is provided in its upper face with a horizontal recess 36 covered by a plate 37 and in its front face with a vertical recess 38 covered in part by a pair of spaced plates 39. On the platform is also supported a wire straightening and feeding mechanism 40 and a cutter mechanism 41. To the front face of the platform 5 is secured a box supporting bracket or ledge 42 having a horizontal flange 43 which receives the box. The bracket 42 is adjustably secured to the platform by any suitable means, as by slots 44 and bolts 45. The walls which define the recess 36 in the block 35 are cut away at the forward ends and on them are mounted guide plates 46 each having a horizontal guide slot 47 through which the wire to be operated upon is fed. The outer edge 48 of the slot 47 in the plate 46 adjacent the feeding mechanism is suitably chamfered and the inner edge 49 of the slot 47 in the other plate 46 is similarly chamfered to facilitate the introduction of the wire into the guide slots.

The head 4 is supported above the platform 5 by walls 50 and 51, each wall having flanges 52 through which bolts 53 pass to secure the walls to the platform. Extending across and resting upon the walls 50, 51 is a plate 54 which carries an upright 55. The plate 54 is pivotally secured to the wall 50 by means of a pin 56 which passes through ears 57 on the wall and a projection 58 on the plate 54. The wall 51 has at each end a post 59 and the plate 54 has a projection 60 which enters the space between the posts. Bolts 61 through the projection 60 removably secure the plate to the wall.

The upright 55 is longitudinally movable in the plate 54 for the purpose of facilitating the operation of the machine. In the plate 54 is formed a dovetailed slot 62 which receives a complementarily formed foot 63 of the upright 55. In the body of the upright 55 is formed a passage 64 closed at the bottom by the foot 63 and through which a bar 65 extends. The upright 55 is movable relative to the bar 65 for the purpose of adjustment by means of the interengagement of teeth 66 formed in the upper face of the bar with the teeth of a pinion 67 in the slot 64 keyed or otherwise suitably secured to a stud shaft 68 which extends through a hole 69 bored in the upright 55. A knob 70 is carried by one end of the shaft 68 and a lock nut 71 is fixed to the other end of the shaft. By means of the knob 70 the shaft 68 and pinion 67 may be rotated and the upright 55 is thereby shifted bodily relatively to the bar 65. The lock nut 71 is, of course, loosened when the upright is to be adjusted, and when the desired position has been attained the nut is tightened to prevent any relative movement between the upright and the bar 65. The bar 65 projects from the rear of the upright 55 and is provided with a roller 72 which enters a path 73 in the upper face of the cam 25 by which the upright is caused to advance or retract in the slot 62.

The front of the upright 55 constitutes a pillar 75 (see Fig. 23) having a transverse slot 76 defined by a front wall 77 and a back wall 78. Within the slot 76 is mounted a cam 79 fixed at one end of a shaft 80. The other end of the shaft 80 is supported by the bracket 16 and a bracket 81 bolted to the bracket 16 below the gear 22. Suitable caps 82 and bolts 83 position the shaft 80 on these brackets. On the shaft 80 between the brackets 16 and 81 is a gear 84 which meshes with the gear 22 on the shaft 15. The gear 84 is keyed on the shaft 80 so that the gear 84 which rotates the shaft is free to move longitudinally thereof when the upright 55 is shifted either by the adjusting means just described or by the bar 65. The position of the gear 84 in mesh with the gear 22 is fixed by means of collars 85 between the gear and the brackets 16 and 81.

In the outer face of the front wall 77 of the pillar 75 is formed a vertical guide 86 closed by a plate 87 secured to the pillar by screws 88, while through the base of the guide 86 is formed a notch 89. In the wall 78 is formed a vertical guide 90 opening into the slot 76. By means of gibs 91, 92 sliding blocks 93, 94 are secured in place in guide 90, the block 93 above the shaft 80 and the block 94 below the shaft. In the base of the guide 90 is formed a notch 95 and the block 93 is caused to reciprocate in the guide 90 by means of a roller 96 which enters a path 97 in the cam 79. The block 94 is similarly caused to reciprocate in the guide 90 by means of a roller 98 in the path 99 formed on the cam 79.

*Wire straightening, feeding and cutting mechanism*

The wire 303 is fed into the machine through a wire straightener 100 shown diagrammatically and which may be of any well-known type. The wire feeder, designated as 101, is also shown somewhat conventionally and may comprise a wire carrying block 102 which is caused to reciprocate by a gear 103 engaging teeth 104 on the block and mounted on a pin 105 which also carries a gear 106 adapted to mesh with a rack 107. The rack 107 is reciprocated by a lever 108 pivotally mounted upon a pin 109 and having a roller 110 which rides in a path 111 in the under face of the cam 28 (see Fig. 5).

The cutter mechanism (Figs. 13, 14 and 15) designated generally by the reference numeral 41, comprises a block 114 having at its outer end an upstanding projection 115 separated horizontally from the main portion of the block by a notch 116. Through the projection 115 is cut a transversely extending slot 117 closed at the top by a plate 118. In the slot 117 are mounted a pair of rectangular strips 119, which abut to form a rectangular bar that fills the slot 117. Each strip has in its abutting face a semi-cylindrical depression, these depressions being so located that, when the strips are assembled in the slot 117, they form a hole 120 through which the wire passes from the feeding mechanism.

The cutting of the wire takes place on the face of the block adjacent the block 35, and it has been found desirable to point the end of the wire by severing the pieces from the wire at an angle. This form of severance is attained by the provision of a tongue 121 formed of two projections extending at the outer end of each strip 119 from the face of the block. The upper surface 122 of the tongue is inclined and extends downwardly from the top of the hole 120 (see Fig. 14). In the upper face of the tongue is formed a groove into which the hole 120 leads. At the corner of the body portion of the block is provided a recess 123 closed by a pair of plates 124 and 125 removably secured to the block. Adapted to reciprocate in the recess 123 is a cutter bar 126 having at the end adjacent the projection 115 a head 127 which carries a cutter blade 128, adapted to cooperate with the strips 119 to sever the wire. The forward face 129 of the blade 128 is inclined backwardly and the lower edge 130 of the blade 128 is also inclined to correspond to the inclination of the upper surface 122 of the tongue 121. The cutter bar 126 is reciprocated by the cam 28 provided with a projection 131 which strikes a roller 132 mounted in the inclined inner end 133 of the bar. A spring 134 extending between posts 135 and 136 carried by the head 127 and the block 114 respectively acts to hold the cutter normally in the inoperative position.

In order to regulate the length of the piece of wire supplied to the machine, the cutter block 114 is adjustable to any desired position between the block 35 and the feeding mechanism 40 by the provision of a track 137 on the platform 5 which enters a recess 138 in the bottom face of the block. In the face of the block 114 adjacent the block 35 is formed a pocket 139 which receives a head 140 of a bolt 141. The head is spaced from the body of the bolt by a shank 142 which enters a notch 143 formed in the lower edge of the plate 124. The bolt 141 passes through a hole 144 in the block 35 with the walls of which it is in threaded engagement. For the purpose of easy operation of the bolt 141, it is also passed through an aperture 145 in the wall 50 and provided with a head 146. By rotating the bolt 141 the block 114 is caused to travel over the track 137 toward or from the block 35. When the desired position of the block 114 has been reached, it is secured therein by a bolt 147 which enters the lower face of the block passing through a slot 148 in the platform 5. The slot 148 is of such dimension that any desired adjustment of the block can be attained without difficulty. Moreover, by providing the notch 143 to receive the shank 142, the block 114 may be removed bodily from the platform 5 without disturbing the adjusting bolt 141, it only being necessary to remove the bolt 147.

*Fastening, shaping and inserting mechanism*

The wire is fed by the means just described into the horizontal slots 47 in the plates 46 of the block 35 and is shaped around an anvil 150. The anvil 150 comprises a head 151 and a shank 152 which is reciprocable in the vertical recess 38 of the block 35 (see Figs. 16 to 20). In the lower end of the shank 152 is formed a slot 153 which receives the end of an arm 154 fixed on a rod 155 (see Fig. 2). The rod 155 is supported in brackets 156, 157 depending from the platform 5 and at its inner end is secured an arm 158 carrying a roller 159 which rides in the path 30 of the cam 29. Suitable sliding bearings are provided to secure the arm 154 in the slot 153 and permit the reciprocation of the anvil 150 upon the oscillation of the arm 154. The head 151 is narrower laterally than the shank 152 and extends in front of and behind the shank providing shoulders 160 and 161. The upper face 162 of the shoulder 160 is inclined and provided with a notch 163.

The wire is shaped around the anvil 150 by a former 165 (Figs. 7 and 12) which is annular in cross section and adapted to reciprocate in the horizontal recess 36 of the block 35. The former 165 comprises parallel walls 166, 167 and a base 168, the walls and base defining a channel 169. The outer end of the base 168 is cut away between the walls 166, 167 to provide a notch 170 defined by arms 171, 172. Mounted upon the arms 171, 172 of the base 168 are wear plates 173, 174 which form continuations of the arms and with them further define the notch 170. Recesses 175 preferably are provided in the walls 166, 167 to receive the outer edges of the plates 173, 174.

Across the outer end of the former 165 in the wear plates 173, 174 and the walls 166, 167 is formed a horizontal depression 176 which is in alignment with the slots 47 of the guide plates 46. In the faces of the wear plates 173, 174 at each side of the notch 170 are formed horizontal depressions 177 which constitute continuations of the depression 176. The former 165 is reciprocated by means of an integral finger 178 which projects from the base 168 and carries a roller 179 which enters a path 180 in the upper face of the cam 28 (Fig. 7).

Supported by and reciprocable relative to the former 165 is an inserter 181 (Figs. 6, 8, 9 and 10) comprising a body portion 182 which rides in the channel 169 of the former and a tongue 183 projecting from the forward end thereof between the plates 173, 174. On the sides of the tongue 183 are ribs 184 which enter the depressions 177 in the wear plates 173, 174. At the outer end of the tongue 183 is formed a horizontal depression 185 which forms a continuation of the depression 176. The lower edge of this end of the tongue is cut away at 186 below the depression 185. The inserter, thus guided in the channel 169 between the wear plates 173 by the rims 184 and depressions 177, is reciprocated therein by the cam 27, a roller 187 on the inner end of the inserter entering a path 188 formed in the upper face of the cam.

Carried in the guide 86 of the pillar 75 is a presser-foot 190 (Figs. 23, 24 and 25) U-shaped in cross section and held in the guide by the plate 87. The presser-foot 190 is reciprocated by the cam 79, being provided on its rear face with a pin 191 which projects through the notch 89 and carries a roller 192 which enters a path 193 on the cam. The base of the channel in the presser-foot 190 is cut away at the lower end so that the channel defining walls 194 form legs 195 provided at their inner faces with integral bosses 196 and in the base 197 of the channel above the cut-away portion is formed in a slot 198.

Mounted to reciprocate in the channel of the presser-foot 190 is an end folder 200 which comprises a rectangular bar having notches 201 formed in each side near the lower end to provide a shank 202 and a head 203 having projecting shoulders 204 (see Fig. 26). The upper face of each shoulder is rounded at 205 on its inner edge and the shank 202 adjacent the head 203 is also rounded at 206 on the inner edge. The end folder 200 is reciprocated in the presser-foot 190 by means of a pin 207 which projects through the slot 198 and carries a roller 208 which enters a path 209 in the cam 79.

The wire feeding, cutting, shaping and inserting mechanisms just described operate in the following manner: As the wire is fed to the block 35, the anvil 150 is caused to rise until the notch 163 in the face 162 of the head 151 is brought into alignment with the slots 47 of the plates 46 and the depression 176 in the former 165 so that the wire at the end of the feeding operation rests in the slots 47, the depression 176 and the notch 163. Before the length of wire to be operated upon is severed, the former 165 is caused to advance a short distance to clamp the wire against the anvil 150 and give it a slight preliminary bend (see Fig. 27). The cutting operation then takes place without any danger that the piece being cut will slip from its proper position in the block 35. The former 165 is next further advanced so that the arms 171, 172 extend at each side of the anvil and shape the wire around the anvil, thus forming a loop, the shanks 306 of which lie in the depressions 177 of the wear plates 173, 174. The presser-foot 190 then descends to rest upon the upper edge of the wall of the box to which the fastener is to be secured. Concomitantly with this movement of the presser-foot the end folder 200 descends inside the box and the upright 55 of the head 4 is retracted to clamp the wall of the box firmly between the end folder 200 and the former 165. The inserter 181 is then advanced a trifle so that the head 305 of the loop enters the depression 185 in the inserter and the tips 307 of the fastener are held against the outer wall of the box. The anvil 150 descends and the inserter is further advanced to force the pointed tips 307 of the fastener through the wall of the box and over the shoulders 204 of the end folder 200. It will be noted that while the portion of the anvil over which the head of the loop is bent by the former 165 is curved it is much less than a semicircle so that the portion 308 of the head 305 of the loop is practically at right angles to the shanks 306 and joins the shanks in shoulders 309. The depression 185 in the inserter is similarly formed and hence there will be no tendency of the fastener to slide lengthwise in the depression 185 even if, as the fastener is inserted into the box wall, one tip meets with greater resistance than the other or is slightly longer than the other. The force of the inserter is received at the shoulders 309 and transmitted longitudinally along the shanks 308 to the tips 307. The tips of the fastener as they leave the inner wall of the box engage the rounded surfaces 205, 206 of the end folder and are thus caused to diverge a trifle. When the fastener is thus inserted in the box wall the former 165 is withdrawn, the fastener being now supported by the inserter 181 which engages the head of the loop, by the walls of the box and by the head 203 of the end folder. This is the position which the fastener occupies at the time prior to the operations of the manipulating mechanism which will now be described.

Fastener manipulating mechanism

Mounted to reciprocate in the recess 38 of the block 35 is a loop folder 210 (Figs. 16, 18 and 19) which comprises a rectangular shank 211 in the outer face of which are milled recesses 212 to provide shoulders 213 which are behind the plates 39, the unmilled portion of the face projecting into the space between the plates. It will be noted from an examination of Fig. 19 of the drawing that the recess 38 of the block 35 comprises two compartments, to wit: an inner compartment 214 in which the shank 152 of the anvil 150 reciprocates, and an outer compartment 215 in which the shank 211 of the loop folder 210 reciprocates. The shank 211 thus holds the shank 152 in place and is in turn held by the plates 39. In the inner face of the shank 211 at its upper end is milled a recess 216 which receives the shoulder 161 of the head 151 of the anvil 150. The upper portions of the walls 217, which define the recess 216, are removed adjacent the outer edge to provide a vertically extending loop folding plate 218. In the upper edge of the plate 218 are formed a pair of notches 219 which are spaced apart a distance equal to that between the shanks defining the loop of the completed fastener. Depressions 220 are formed in the outer face of the plate as continuations of the notches 219. The loop folder 210 is reciprocated in the slot 38 in a manner similar to the anvil 150, a slot 221 at the lower end of the shank 211 receiving one end of an arm 222 carried by a rod 223, and suitable sliding bearings being provided in the slot 221 to connect the arm 222 to the shank 211. The rod 223 is supported by the brackets 156, 157 which support the rod 155 and is provided at its outer end with an arm 224 having a roller 225 which enters the path 31 in the cam 29.

Carried by the presser-foot 190 are a pair of end benders 230 (Figs. 23, 25, 28 and 31) which project through the notches 201 at each side of the shank 202 of the end folder 200. These end benders are pivoted upon a pin 231 rigidly secured in the bosses 197 on the legs 195 of the presser-foot 190. In the inner face of the cover plate 87 near its lower end are milled recesses 232 to permit the oscillation of the benders 230 on the pin 231. Integral arms 233 projecting from the rear of the benders carry a pin 234 which is engaged by a finger 235 projecting forwardly at an angle from the lower edge of the block 94 and having a slot 236 in which is received the pin 234 carried by the arms 233. The previously described reciprocation of the block 97 by the roller 98 and path 99 of the cam 79 causes the oscillation of the end benders 230.

End turners 240 (Figs. 2, 3, 4, 21 and 22) are carried by the pillar 75, being mounted to reciprocate in channels 241 of plates 242 secured to the convergingly inclined lower faces 243 of the pillar at substantially an angle of 90° to each other. At the inner ends of the end turners 240 are plates 244 secured thereto by screws 245. In the forward edge of each of the plates 244 is formed a notch 246 from which leads a depression 247 milled in the outer face of the plate. Adjustably secured in the end turners 240 are bolts 248 having cylindrical heads 249 provided with annular recesses 250. Levers 251 are pivoted on studs 252 on the rear face of the pillar 75. The arm 253 of each lever is Z-shaped, and its outer end 254 is bifurcated to enter one of the recesses 250. In the arm 255 of each lever is formed an elongated slot 256, the arms 255 being offset sufficiently so that the slots 256 overlap. Through these overlapping slots 256 extends a roller 257 on a pin 258 carried by the block 93 and projecting through the notch 95 in the wall 78. As the block 93 is reciprocated by the roller 96 in the path 97 of the cam 79, the levers 251 are oscillated on the studs and the end turners are caused simultaneously to advance toward and retreat from a common goal.

In the channel 169 of the former 165 and resting upon the inserter 181 is a clencher 260 (Figs. 5 and 11) which comprises a shank 261 carrying a roller 262 guided by a path 263 in the end face of the cam 26 and a nose 264, the width of which is less than that of the shank 261 so that it will enter the loop of the fastener.

The fastener manipulating mechanism thus described in detail operates in the following manner: After the fastener 300 has been driven by the inserter 181 into the wall 301 of the box 302 and while the head 305 of the loop is still supported in the depression 185 of the inserter the loop folder 210 rises to fold the loop 310 against the outer wall of the box (Fig. 29). As the loop folder strikes the under side of the fastener, the inserter 181 is retracted so that the loop 310 can be raised without difficulty into the vertical position. The shanks 306 of the loop enter the notches 219 of the plate 218 so that the fastener is held against shifting in the wall and the depressions 220 engage the shanks as the loop folding continues. Concomitantly with the initiation of the upward folding of the loop by the folder 210 the upright 55 of the head 4 is moved forward to carry the end folder 200 away from the box a distance substantially equal to the diameter of the wire used in the formation of the fastener. The end folder 200 then follows the loop folder 210 upwardly raising the ends 311 of the fastener into the vertical position (see Fig. 30). By shifting the end folder 200 away from the wall 301 of the box before starting the folding operation and by delaying the start of the end folding until after the loop has been partially folded, the danger of tearing the wall of the box has been practically eliminated. The presser-foot 190, of course, slides with the end folder but still bears upon the upper edge of the wall 301 of the box to prevent it from being raised off the supporting ledge 42 by the action of the folders 200 and 210.

As previously pointed out, the ends of the fastener as they emerge into the interior of the box are forced by the surfaces 205 and 206 of the end folder to diverge slightly and hence when the ends are raised into the vertical position, they are not parallel with the shanks of the loop but are outside the shanks 306 an appreciable distance. The end benders 230 are then caused to oscillate on the pin 231 carrying the ends of the fastener over the upper edge of the box and over the top edge of the loop folding plate 128 which is held at its upper position with the edge of the plate 218 at the upper edge of the box wall (Fig. 31). Thus, when the end benders act the ends of wire are bent over exactly at the upper edge of the wall.

The end turners 240 are now caused to advance, and as the ends of the wire enter the notches 246, the loop folder descends so that the ends of the wire are now turned across the shanks 306 of the loop 310 at an angle corresponding to the angle between the end turners on the pillar 75 (Fig. 32). The clencher 260 then advances and forces the tips of the wire into the loop embedding them in the wall of the box, which is supported at its inner face by the end folder 200 (Fig. 33). The clencher withdraws, and at the same time the presser-foot 190 and the end folder 200 rises leaving the box with the fastener secured in the wall of the box. Both units are identical in structure and operate simultaneously so the opposite walls of the box are provided with fasteners.

I claim:

1. In a machine of the class described means for forming and inserting a fastener partially through the wall of a box, means for folding the portions of said fastener projecting from each side of said wall into parallelism, means for bending one of said portions over the edge of said box wall, and means for turning said bent portion across the other portion.

2. In a machine of the class described means for forming and inserting a fastener partially through the wall of a box, means for folding the portions of said fastener projecting from each side of said wall into parallelism, means for bending one of said portions over the edge of said box wall, means for turning said bent portion across the other portion, and means for clenching the turned portion into the wall of said box thus fixing said other portion in position.

3. In a machine of the class described having means for forming a fastener from a length of wire, means for feeding said wire to said forming means, and means intermediate said feeding and forming means for cutting the length of wire to be formed from the supply, said cutting means including a block having a hole through which the wire is fed, a tongue on the face of said block having an inclined upper face provided with a groove into which the hole leads, and which receives the wire and a cutter blade, the lower face of which inclines in correspondence with the upper face of said tongue whereby said length of wire is cut at an angle from the supply.

4. In a machine of the class described having means for forming a fastener from a length of wire, means for feeding said wire to said forming means, means intermediate said feeding and forming means for cutting the length of wire to be formed from the supply, an anvil, and a former between which said length of wire is fed, and means for moving said anvil and former relatively to clamp said length of wire prior to the operation of said cutting means, and thereafter to form the fastener.

5. In a machine of the class described means for shaping a length of wire into the form of a staple having pointed ends at right angles to the wall of the box, means for inserting said formed wire partially through the wall of the box whereby a loop is provided at one side of the wall and a pair of ends are provided at the other side of the wall, and means for supporting the wall of the box during the operation of the inserting means and causing the ends of the formed wire to diverge as they emerge from the wall.

6. In a machine of the class described in which a fastener in the form of a staple is inserted through the wall of a box with a loop at one side of the wall and a pair of ends at the other side, means for folding the loop end of the fastener against the face of the wall, and means for folding the ends against the same face of the wall.

7. In a machine of the class described in which a fastener in the form of a staple is inserted through the wall of a box with a loop at one side of the wall and a pair of ends at the other side, means for folding the loop end of the fastener against the face of the wall, means for folding the ends against the other face of the wall, means for bending said ends over the edge of said wall at the outer sides of said loops, means for turning said ends across the shanks of said loop, and means for clenching the ends of said fastener into the wall of said box within said loop.

8. In a machine of the class described in which a fastener in the form of a staple is inserted through the wall of a box with a loop at one side of the wall and a pair of ends at the other side, means for folding the loop end of the fastener against the face of the wall, means for folding the ends against the other face of the wall, and means for bending said ends over the edge of said wall, said edge being supported by said loop folding means which defines the bend of said ends.

9. In a machine of the class described in which a fastener in the form of a staple is inserted through the wall of the box with a loop at one side of the wall and a pair of ends at the other side, means for folding the loop and the pair of ends against the faces of the wall so that they project beyond one edge thereof and means for joining the projecting portions of the fastener.

10. In a machine of the class described in which a fastener in the form of a staple is inserted through the wall of the box with a loop at one side, means for folding the loop and the pair of ends against the faces of the wall so that they project beyond one edge thereof and means for bending the projecting portions of the pair of ends over the edge of the wall into engagement with the loop thereby securing it in its folded position against the face of the wall.

11. In a machine of the class described, means for inserting a fastener in the form of a staple partially through the wall of a box, a folder for supporting the wall of the box during the insertion of the fastener, and for spreading the inserted ends of the staple during such operation and means for actuating said folder and causing it to fold such ends against the face of the wall.

12. In a machine of the class described, means for inserting a fastener in the form of a staple partially through the wall of the box, a folder for supporting the wall of the box during the insertion of the fastener, a bracket upon which the box rests, means for actuating said folder and causing it to fold the inserted portion of the fastener against the face of the wall, and a presser foot holding the box against the bracket during the inserting of the fastener and the folding of the inserted portions.

13. In a machine of the class described, means for inserting a fastener in the form of a staple partially through the wall of a box, a bracket upon which the box rests and a presser foot bearing upon the edge of the wall and holding the box against the bracket during the insertion of the fastener.

14. In a machine of the class described, means for inserting a fastener in the form of a staple partially through the wall of a box, a bracket upon which the box rests, means for manipulating the projecting portions of the fastener and a presser foot bearing upon the edge of the wall and holding the box against the bracket during the insertion and manipulation of the fastener.

15. In a machine of the class described, means for inserting a fastener in the form of a staple partially through the wall of the box, and means for clenching the ends of the fastener about the loop portion.

16. In a machine of the class described, means for inserting a fastener in the form of a staple partially through the wall of the box, means for supporting the wall of the box, means for folding the loop portion into parallelism with the wall of the box, means to actuate said supporting means for folding the end portions against the wall of the box, and means for clenching the end portions about the loop portions while the supporting means is in a position of support.

17. In a machine of the class described, means for inserting a fastener partially through the wall of a box, means for supporting the wall and for spreading the end portions of the fastener out of parallelism, means for folding the projecting portions of the fastener against the wall of the box, and means for clenching the ends of the fastener around corresponding portions of the loop while the supporting means is in position of support.

18. In a machine of the class described, means for forming a fastener in the form of a staple, comprising an anvil, and forming bars, means for inserting the fastener partially through the wall of a box, means for folding the end portions of the fastener against the wall of the box, and means to actuate said folding means to clamp and support the box between said folding means and the forming bars during insertion of the fastener.

19. In a machine of the class described, means for forming a fastener in the form of a staple, comprising an anvil and forming bars, means for inserting the fastener partially through the wall of a box, means for folding the end portions of the fastener against the wall of the box, means to actuate said folding means to clamp and support the box between said folding means and the forming bars during insertion of the fastener, means to fold the loop portion against the wall of the box, and means to join and clench the projecting portions of the fastener.

20. In a machine of the class described, means for forming a fastener in the form of a staple, means for inserting the fastener partially through the wall of a box, means for supporting said wall during insertion, and means to actuate said supporting means for bending the inserted portion of the fastener into parallelism with the box wall.

21. In a machine of the class described, means for forming a fastener in the form of a staple, means for inserting the fastener partially through the wall of a box, means for supporting said wall during insertion, means to actuate said supporting means for bending the inserted portion of the fastener into parallelism with the wall, and means to clench the projecting ends of the fastener.

22. In a machine of the class described, means for forming a fastener in the form of a staple, means for inserting the fastener partially through the wall of a box, whereby a loop is provided at one side of the wall, and a pair of ends on the other side of the wall, and means for supporting the wall of the box during the operation of the inserting means and for bending the ends of the fastener out of parallelism as they emerge from the wall.

23. In a device of the class described, means for inserting a fastener in the form of a staple partially through the wall of a box, whereby a loop portion is provided on one side of the wall and a pair of ends on the other side, means for supporting said box during the operation of the inserting means and for causing the ends of the fastener to diverge, folding means for the loop portion, means to actuate said supporting means to fold the ends of the fastener against the wall of the box, and means for bending said end portions over the edge of the box while the loop folding means retains the fastener in position.

24. In a device of the class described, means for inserting a fastener in the form of a staple partially through the wall of a box, whereby a loop portion is provided on one side of the wall and a pair of ends on the other side, means for supporting said box during the operation of the inserting means and for causing the ends of the fastener to diverge, folding means for the loop portion, means to actuate said supporting means to fold the ends of the fastener against the other wall of the box, means for bending said end portions over the edge of the box while the loop folding means retains the fastener in position, and means for bending the loop portion of the staple into parallelism with the wall of the box for holding the legs of the loop portion in parallelism during operation of said bending means.

25. In a machine for forming and inserting wire fasteners, means for feeding a wire, means for cutting therefrom predetermined lengths of wire from which the fasteners are formed, an anvil, a former for clamping said wire against said anvil, means for actuating said clamping means to form a fastener, means to withdraw said anvil whereby the fastener may be inserted into the box, means to insert the fastener into a box, and means to clench the projecting portions of a fastener together.

Signed by me at Attleboro Falls, Massachusetts, this 30th day of April, 1928.

KENNETH F. BERTHOLD.